United States Patent Office 2,763,417
Patented Sept. 18, 1956

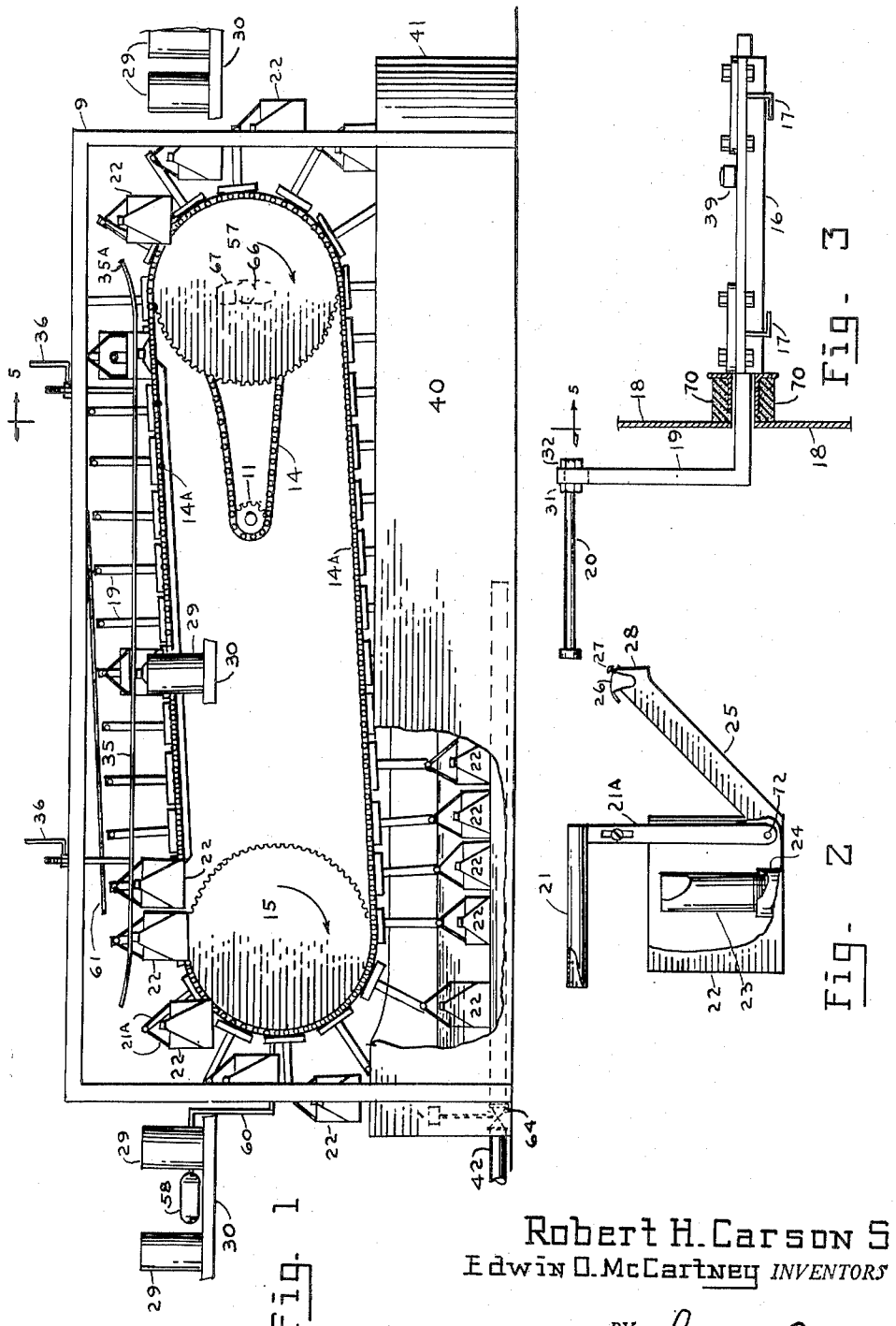

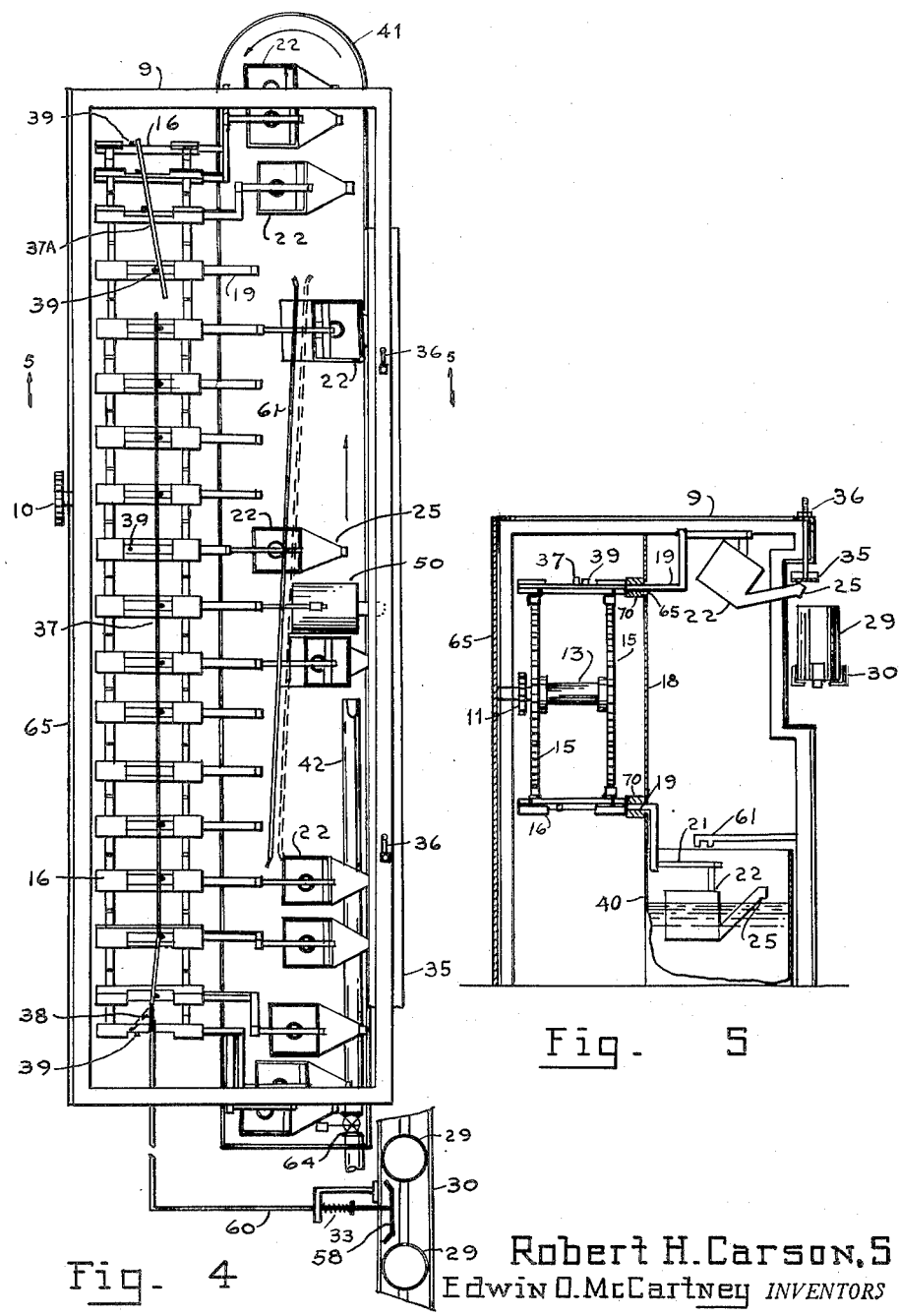

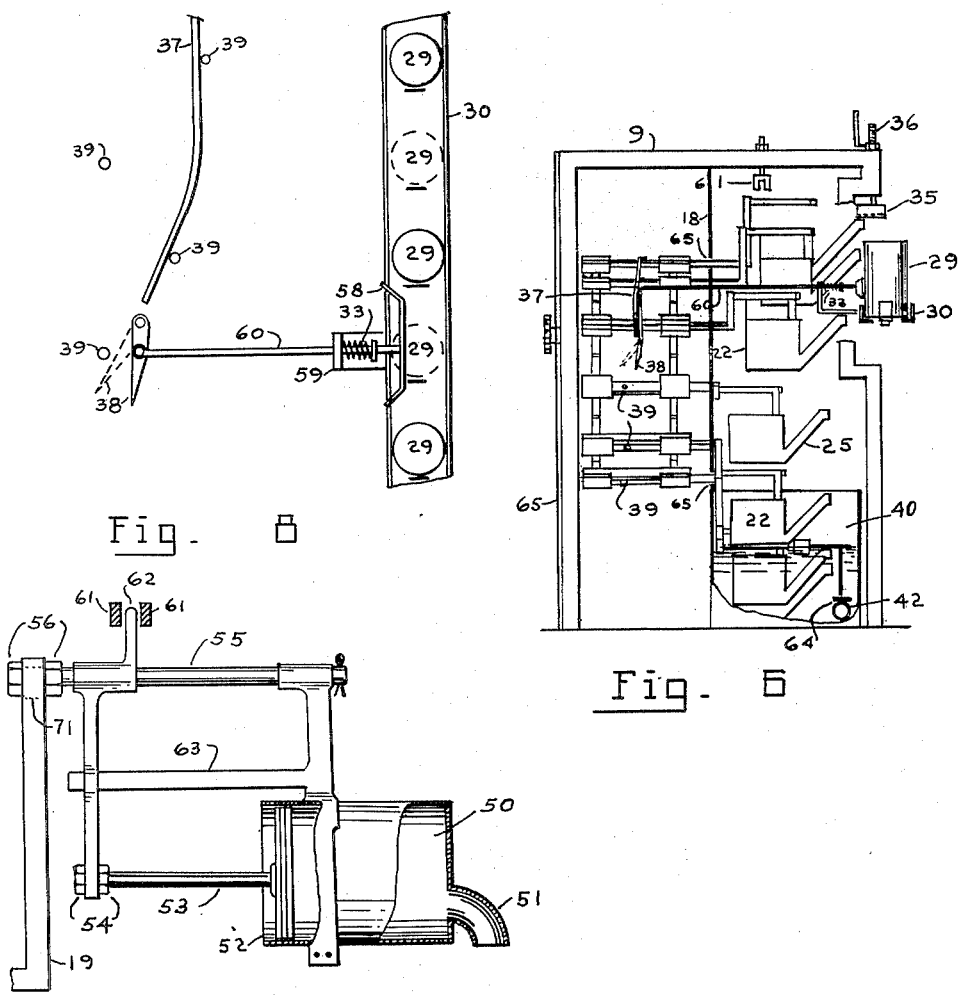

2,763,417

FILLING MACHINE

Robert H. Carson, Sr., and Edwin O. McCartney, Tampa, Fla.

Application September 11, 1952, Serial No. 309,076

3 Claims. (Cl. 226—95)

This invention relates to an improvement in filling machines, particularly filling machines designed for use in filling cans with edible fruit juices of various types.

It is an object of the present invention to provide a filling machine which will fill containers traveling in a straight line from the source of supply of the containers to the sealing or closing machine in an automatic manner.

A further object of the present invention is to provide automatic straight-line filling machine for use in filling cans with edible juices, particularly citrus juices in a simple manner while keeping the juice sterile and bacteria free at all times.

It is a further object of the present invention to provide an automatic filling machine for citrus juices in which adjustments of the machine to regulate the amount to be filled and other purposes are very readily made by the operator in a simple manner, there being a number of different possible adjustments which can be made by the operator of the machine.

Another object of the present invention is to provide a simple automatic filling device which will automatically refrain from pouring out the liquid in case there is no can or other container in position to be filled.

Other important advantages of the invention will be readily apparent during the course of the following description, reference being had to the accompanying drawings, wherein has been illustrated a preferred example of the invention and wherein like character references have been employed to designate like parts throughout.

In the drawings:

Figure 1 is an overall side elevation view of the mechanism of the present invention with the side wall removed and a portion of the tank wall cut away.

Figure 2 is a side elevation, partly cut away, of one of the bucket scoops, showing the detail assembly of these scoops and the adjustable spout.

Figure 3 is a detail view of shuttle and scoop arm with means of suspending the bucket scoop, showing a dividing wall—slotted for scoop arms to travel through and a sealing means.

Figure 4 is a top plan view of the overall assembly of the present invention, with the top cover removed.

Figure 5 is a sectional elevation view on line 5—5 of Figure 1, looking in the direction of the arrows.

Figure 6 is an end elevation of the machine with the outer wall removed, showing the position of the bucket scoops with the wall of the tank partly cut away.

Figure 7 is a detail view of a plunger type scoop and supporting arm with the wall of the scoop partly cut away to show the internal piston arrangement.

Figure 8 is a detailed plan view of a track switch in operation when a receiving container is missing from the line.

Referring again to the drawing, the filling machine is surrounded by a steel frame 9. Sprocket gear 10 is actuated by an external mechanical means such as an electric motor not shown and is mounted on the same shaft as sprocket wheel 11 which carries chain 14, which, in turn, drives shaft 13 carrying large sprocket wheels 57. Sprocket chain 14a is carried by large sprocket wheels 57 and at its opposite end is supported by large sprocket wheels 15.

Large sprocket wheels 57 are mounted on shaft 66 which is adjustable in height through slot 67 in the back plate 65.

The square shuttle bar 16 is mounted on tracks 17. There is a dividing wall 18 in the machine which is slotted to permit arms 19 to go through and support the supporting spindle 20 for the bucket scoops 22, which move in a clockwise direction, as shown in Figure 1. The bucket scoop has at its top a sleeve 21 which is supported by the said spindle 20, thus giving scoops 22 a trapeze-type mounting. Sleeve 21 is rigidly attached to straps 21a which hold scoops 22 on a pivot joint to permit tilting.

Inside of each scoop 22 there is an adjustable overflow pipe 23 which is mounted by means of screw threads in flange 24 which is internally threaded and mounted on the bottom of the scoop 22. There is a hole, not shown, in the bottom of scoops 22 which is surrounded by flange 24.

An adjustment 26 on the end of the scoop spout 25 is controlled by adjustment screw 27. The adjustment 26 is just above the open mouth 28 of the spout 25.

The receiving containers 29 which in the illustration herein are cans, run in a straight line along a chute 30 from a source, not shown, to a sealing machine, not shown.

Nuts 31 and 32 are used for adjusting or changing the position of spindle 20.

Spring 33 is mounted on rod 60 so as to push strike plate 58 against containers 29. Rod 60 connects the strike plate 58 with rail switch 38. This connection may be direct or preferably is through an electrical system not shown. Roller lugs 39 are mounted on shuttle 16. Track rail 37 is mounted so as to contact roller lugs 39. Rail 37a is positioned to return lugs 39 to original position for recycling. Discharge rail 35 is mounted so that the ends of the spouts 25 are normally contacted for discharge purposes. 36 are adjustments controlling the position of discharge rail 35.

Tank 40 has one rounded end 41 to assist in circulating the juice. This tends to eliminate turbulence of the liquid which retards the filling of the scoops. Said tank 40 is kept filled to the proper level with juice as supplied by pipe 42 receiving the juice from a source of supply not shown.

In Figure 7 is shown a variation of the invention in the form of a different type of scoop, known as a plunger type of scoop 50. This type of scoop has a spout 51, an adjustable plunger 52, plunger rod 53 with nuts 54 for adjusting said plunger rod 53, an adjustable arm 55 for holding said plunger scoop 50 with nuts 56 for adjusting the arm 55. A lever 62 and a guide rail 61 actuate the plunger scoop 50. In this type means is also provided to retract plunger 52 when scoop 50 is under the liquid level in order to fill it. This type is used for slow flowing liquids, such as syrups, oils and the like.

Another important advantage of the present invention lies in the simple mechanical means of adjusting its performance, in the raising and lowering of sprocket wheel 57, so the traveling chain 14a moves at different level with respect to the liquid in the tank 40, this allows for slower filling of scoop 22, as spout 25 on scoop 22 progress along the rail 35 the body of the scoop 22 is raised by pitch of chain 14a. Another adjustment is provided by slots in arm 19, for adjusting spindle 20 and scoop 22 and bail 21a, Fig. 2 and spindle 55, Fig. 7.

A sealing means is shown, Figs. 3 and 5, by 70, and bail hinge by 72, Fig. 2.

Operation

In operation this filling machine is filled through supply pipe 42, filling the tank to a desired level which is maintained by flow valve control 64. The bucket scoops 22 at the lowest level of chain 14a are held at a level which completely submerges them in the liquid so that they will be automatically filled to any predetermined and adjustable level, depending upon the setting of the overflow pipe 23. Any extra juice will flow out through this overflow pipe and out through the bottom of the scoop 22 so that all scoops are automatically filled to a predetermined level. Roller lugs 39 are contacted by guide rail 37 and forced forward which, in turn, forces shuttle bar 16 forward carrying with it scoop arm 19, spindle 20 and scoop 22, thus positioning spout 25 directly under discharge rail 35. As the scoops 22 rise out of the juice, they are brought up to the top of the machine where the spout 25 contacts through adjustable control 26 the discharge rail 35 which automatically forces the spout 25 downward, tipping the scoop 22 so that it discharges the contents into one of the containers 29.

Discharge rail 35 is set at a slight and adjustable angle to the horizontal so that scoops 22 are slowly tilted more and more as they progress down the rail 35. As a result, scoops 22 discharge their contents gradually until they reach the end of the discharge rail 35a which is turned upwardly so that scoops 22 automatically right themselves. Scoops 22 do not entirely empty themselves. Since it is not necessary to wait for the last few drops to emerge, greater speed in filling containers 29 is achieved.

After scoop 22 has discharged its contents, roller lug 39 is contacted by rail 37a which forces lug 39, together with bar 16, scoop arm 19 and scoop 22, back to its original position for recycling.

The exact amount of juice to be discharged can also be controlled by adjusting the scoop spout adjustment 26 by screw 27 on the individual scoops 22, or it can be adjusted for the entire movement by raising or lowering the discharge rail 35 by means of adjustment 36. The end of discharge rail 35a is turned sharply upward so that the scoops will right themselves quickly without too much splashing of juice after the discharge.

If for any reason one of the containers 29 is missing, strike plate 58 will be pushed out by spring 33, thus opening switch 38. In this case rail switch 38 will not move roller lug 39 to the front of the guide rail 37. As a result, guide rail 37 will not force roller lug 39 forward. Thus shuttle 16, arm 19, spindle 20 and scoops 22 will remain in their original positions, and scoops 22 will not be tipped by discharge rail 35. Thus when a container 29 is missing form the line, the corresponding scoop will return with its contents to the tank without discharging said contents.

In case thick or syrupy liquids are used, which would not normally flow by gravity, another form of the invention is shown in Figure 7. Instead of scoops 22, a plunger type scoop 50 is used, which is actuated by lever 62 and guide bars 61 and otherwise works in a somewhat similar manner to the preferred form of the invention described above. The lever 62 is actuated in a similar manner to roller lug 39, and in turn moves piston 52 forward which forces the syrupy liquid out of cylinder 50 through spout 51 into containers 29.

Since the mechanism is at all times enclosed in a chamber together with the hot liquid to be filled, which in the case of citrus juices is kept at about 190° F., the novel mechanism of this invention is much more sanitary than conventional filling machines.

The fresh preheated hot juices entering the supply tank 40 creates a hot vapor that not only sterilizes the scoops 22 while in operation at all times as they pass through the supply tank 40, but the hot vapor sterilizes the scoop spouts 25 and the trip rail 35, and all mechanism of the filler. This filler does not have any rubber parts to collect bacteria, extreme cold does not kill bacteria and their spores, but prolonged vapor heat coming from a continuous supply of heated juices will. No vents or pipes that release air from the containers that are being filled as in the conventional type are used, further the heated juice in constant circulation in supply tank does not allow any accumulation of bacteria forming material to lodge on walls of supply tank, by having the scoops heated this creates an outward pressure from the scoop so that the spouts have no incoming air at any time and due to the fast moving parts of the filler all the mechanism is heated to a high degree by the rising vapor at all times. This sanitary features is very important in the canning of citrus fruit juices. The dividing wall 18 which is slotted to allow scoop arm 19 to move through wall 18 has a sealing means to prevent the hot vapor from escaping and to keep out any foreign material. A hood, not shown, is provided over the filler mechanism.

Another important advantage of the present invention lies in the simple mechanical means of adjusting its performance. Several different adjustments are provided which can be made by an unskilled operator, some even while the machine is in operation. Thus the amount discharged by each scoop 22 can be controlled by adjusting over-flow pipe 23 located in the bucket-scoop 22 or by adjusting nose 28 on spout 25 of scoop 22, or by raising or lowering of the adjustment rail 35 while machine is in operation or by adjusting sprocket wheel 57, so that the traveling chain 14a moves at a different height with respect to the liquid level in tank 40. It is of course necessary that the scoops 22 and containers 29 move at the same speed.

Other advantages of the present invention will be obvious to those skilled in the art and our invention is only limited by the following claims.

We claim:

1. In a liquid container filling machine having a multiplicity of trapeze mounted scoops, a multiplicity of said containers moving along a chute in a straight line from their source through said filling machine to a sealing mechanism, means for detecting absence of any one of said containers in said line and means consisting of rail switch and striker plate to actuate said rail switch to prevent emptying of said scoop positioned to fill said absent container, said scoops being mounted on an endless chain by means of spindles and shuttle bars, said scoops being submerged in vertical position by means of said endless chain in a liquid containing tank, said liquid filling said scoops from the bottom to a level predetermined by overflow pipes inside said scoops, said scoops then raised by said endless chain out of said liquid, spouts with adjustable supports attached to bottom of each of said scoops, said adjustable supports contacting a stationary discharge rail when said scoops are raised, said discharge rail being set at a slight adjustable angle to the horizontal and having a sharply turned up end, said contact forcing said spout to dip downwardly so as to discharge a predetermined amount of liquid contents into one of said containers, said sharply turned up end of said discharge rail quickly breaking off contact with said spouts, said scoops quickly righting themselves on their trapeze mounting and being returned to the said liquid containing tank to be refilled and repeat said cycle, all of said scoops being at all times enclosed in a vapor containing chamber, said endless chain and shuttle bars being outside of said chamber.

2. In a liquid container filling machine having a multiplicity of trapeze mounted scoops, a multiplicity of said containers moving along a chute in a straight line from their source through said filling machine to a sealing mechanism, means for detecting absence of any one of said containers in said line and means consisting of rail switch and striker plate to actuate said rail switch to prevent emptying of said scoop positioned to fill said absent container, said scoops being mounted on an endless chain by means of spindles and shuttle bars, roller lugs on said shuttle bars contacting said rail switch, said scoops being submerged in vertical position by means of said endless chain in a liquid containing tank, said liquid filling said scoops from the bottom to a level predetermined by overflow pipes outside said scoops, said scoops then raised by said endless chain out of said liquid, spouts with adjustable supports attached to bottom of each of said scoops, said adjustable supports contacting a stationary discharge rail when said scoops are raised, said discharge rail being set at a slight adjustable angle to the horizontal and having a sharply turned up end, said contact forcing said spout to dip downwardly so as to discharge a predetermined amount of liquid contents into one of said containers, said sharply turned up end of said discharge rail quickly breaking off contact with said spouts, said scoops quickly righting themselves on their trapeze mounting and being returned to the said liquid containing tank to be refilled and repeat said cycle, all of said scoops being at all times enclosed in a vapor containing chamber, said endless chain mechanism being outside of said chamber, and adjustment on said discharge rail to adjust the height and angle of said discharge rail so as to alter the amount of liquid discharged from said scoops, said adjustment being usable without stopping said filling machine, the amount of liquid put into said containers also being controllable by adjusting the height of the over-flow pipe in each of said scoops.

3. In a liquid container filling machine having a multiplicity of trapeze mounted scoops, a multiplicity of said containers moving along a chute in a straight line from their source through said filling machine to a sealing mechansm, means for detecting absence of any one of said containers in said line consisting of rail switch and striker plate to actuate said rail switch to prevent emptying of said scoop positioned to fill said absent container, said scoops being mounted on an endless chain by means of spindles and shuttle bars, said scoops being submerged in vertical position by means of said endless chain in a liquid containing tank, said liquid filling said scoops from the bottom to a level predetermined by overflow pipes outside said scoops, said scoops then raised by said endless chain out of said liquid, spouts with adjustable supports attached to bottom of each of said scoops, said spouts contacting a discharge rail when said scoops are raised, said discharge rail being set at a slight adjustable angle to the horizontal and having a sharply turned up end, said contact forcing said spout to dip downwardly so as to discharge a predetermined amount of liquid contents into one of said containers, said sharply turned up end of said discharge rail quickly breaking off contact with said spouts, said scoops quickly righting themselves on their trapeze mounting and being returned to the said liquid containing tank to be refilled and repeat said cycle, all of said scoops being at all times enclosed in a vapor containing chamber, said endless chain, spindles and shuttle bars being outside of said chamber, the said sharply turned up end of said discharge rail being positioned so that the said scoops do not entirely empty their contents into said containers.

References Cited in the file of this patent

UNITED STATES PATENTS

| | | |
|---|---|---|
| 961,741 | Workman | June 14, 1910 |
| 2,049,538 | Friend | Aug. 4, 1936 |
| 2,433,478 | Nelson | Dec. 30, 1947 |
| 2,452,666 | Kuther et al. | Nov. 2, 1948 |
| 2,542,133 | Gorby | Feb. 20, 1951 |